US009630680B1

(12) United States Patent
Griffith, Jr.

(10) Patent No.: US 9,630,680 B1
(45) Date of Patent: Apr. 25, 2017

(54) TWO SPEED BICYCLE TRANSMISSION WHERE PEDALING BACKWARD INHERENTLY PROVIDES A HIGHER FORWARD DRIVING SPEED RATIO

(71) Applicant: W. Robert Griffith, Jr., Scottsdale, AZ (US)

(72) Inventor: W. Robert Griffith, Jr., Scottsdale, AZ (US)

( * ) Notice: Subject to any disclaimer, the term of this patent is extended or adjusted under 35 U.S.C. 154(b) by 0 days.

(21) Appl. No.: 15/350,882

(22) Filed: Nov. 14, 2016

(51) Int. Cl.
*B62M 9/04* (2006.01)
*B62M 1/36* (2013.01)

(52) U.S. Cl.
CPC ............... *B62M 9/04* (2013.01); *B62M 1/36* (2013.01)

(58) Field of Classification Search
CPC ... B62M 9/04; B62M 1/36; F16H 7/02; F16H 9/04; F16H 9/24; Y10T 74/19172
USPC ...................................... 474/61, 62
See application file for complete search history.

(56) References Cited

U.S. PATENT DOCUMENTS

| 324,099 | A | | 8/1885 | Emerson |
| 325,270 | A | * | 9/1885 | Pridmore ................. F16H 7/02 474/62 |
| 378,088 | A | | 2/1888 | Foote |
| 797,814 | A | | 8/1905 | Mimard |
| 954,672 | A | | 4/1910 | Didierjean |
| 3,209,621 | A | | 10/1965 | Laurent |
| 3,929,038 | A | | 12/1975 | Moser |
| 4,582,318 | A | | 4/1986 | Giannelli |
| 5,254,042 | A | | 10/1993 | Chung-Suk |

(Continued)

FOREIGN PATENT DOCUMENTS

| FR | 338127 | 5/1904 |
| FR | 354891 | 10/1905 |

(Continued)

OTHER PUBLICATIONS

Terrot Et Cie, Product Catalog, pp. 9 & 30, 2nd edition, 1904, Dijon, France.

(Continued)

*Primary Examiner* — William E Dondero
*Assistant Examiner* — Robert T Reese
(74) *Attorney, Agent, or Firm* — Mark V. Loen

(57) ABSTRACT

The present invention discloses a two-speed bicycle transmission that utilizes a backward pedaling power input mode to provide a higher forward driving speed ratio ("lower gear") inherently, without the intervention of any other means of rider control. Such bicycle transmissions were popular in the early part of the 20th Century and marketed as "Retro-Direct." Since, bicycle transmissions offering even greater numbers of selectable forward pedaling mode speeds have been developed, but at the expense of complexity and reliability, thereby causing a growing fraction of the cycling public to prefer single-speed bicycles for reasons of lower maintenance and/or minimalist aesthetics. Accordingly, the focus of the present invention is to provide a useful second speed with a minimum of added complexity by adapting a uniquely configured and functionally improved Retro-Direct transmission to the modern bicycle. Additionally, a beneficial backward pedaling exercise mode is reintroduced.

1 Claim, 5 Drawing Sheets

(56) References Cited

U.S. PATENT DOCUMENTS

| | | | |
|---|---|---|---|
| 5,884,927 A * | 3/1999 | Mahaney | B62M 9/04 |
| | | | 280/237 |
| 5,918,894 A | 7/1999 | Toronto et al. | |
| 6,695,332 B1 | 2/2004 | Kang | |
| 7,497,793 B2 | 3/2009 | Hee | |

FOREIGN PATENT DOCUMENTS

| | | | |
|---|---|---|---|
| FR | 373624 | | 5/1907 |
| FR | 547110 A | | 12/1922 |

OTHER PUBLICATIONS

Berto, Frank J., The Dancing Chain, pp. 67 & 68, 4th edition, 2012, Cycle Publishing, San Francisco, CA.
Wlson, David Gordon, Bicycling Science, pp. 86-88, 3rd edition, 2004, MIT Press, Cambridge, MA.
Wikipedia, Retro-direct. < https://en.wikipedia.org/wiki/Retro-direct >.
Scott Mayson, Retro Direct Velo. < http://scottmayson.com/retrodirect/ >.
Josh Bechtel, Retro-Direct Bicycle Revisited. < https://www.youtube.com/watch?v=luQ3VRKZiN4 >.

* cited by examiner

TWO SPEED BICYCLE TRANSMISSION WHERE PEDALING BACKWARD INHERENTLY PROVIDES A HIGHER FORWARD DRIVING SPEED RATIO

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING

Not applicable.

BACKGROUND OF THE INVENTION

Field of the Invention

In general, the present invention pertains to a class of mechanical power transmissions having two alternately usable parallel transmitting paths between a single input and a single output so arranged that a change in the direction of rotation of the input changes the path through which power is transmitted.

More specifically, the present invention pertains to a related subclass of pedal and crank driven chain and sprocket geared bicycle transmissions so arranged that reversal of the rotational direction of pedaling inherently selects an alternate transmitting path resolved at the bicycle rear hub to accomplish a higher or lower forward driving speed ratio. Implicit in such a self-contained all mechanical arrangement is:

1. A first forward pedaling mode transmitting path input/output must be co-rotational and incorporate a first forward driving oriented overrunning clutch, and
2. A second backward pedaling mode transmitting path input/output must be counter-rotational and incorporate a second forward driving oriented overrunning clutch.

Then when a given pedaling mode is input the associated overrunning clutch engages to transmit a forward driving effort via its modal transmitting path while the un-associated overrunning clutch overruns (i.e., turns freely) to disengage its modal transmitting path, and when the rate of either pedaling mode input is less than the output (coasting) both overrunning clutches overrun to disengage both modal transmitting paths.

Description of the Related Art

In the early part of the 20th Century, both the Hirondelle and Terrot companies in France manufactured bicycles equipped with two-speed transmissions of the above described subclass which inherently shifted to a higher forward driving speed ratio when the rider pedaled backward. Both of these competing transmission systems were marketed to the public as "Retro-Direct," as translated from the French. See for instance U.S. Pat. No. 0,797,814 to Mimard (manufactured by Hirondelle) and FR 338127 to Terrot & Company.

Of the same era and over the ensuing years, differently configured Retro-Direct bicycle transmissions were conceived and patented. See for instance FR 354891 to Terrot & Company, U.S. Pat. No. 0,954,672 to Didierjean, U.S. Pat. No. 5,254,042 to Chung-Suk and U.S. Pat. No. 6,695,332 B1 to Kang.

Summarizing the principal attributes for each of the above cited patents:

U.S. Pat. No. 0,797,814 to Mimard. The alternate forward driving speed ratio transmitting paths are implemented by reversibly recirculating a drive sprocket driven endless chain from a first rear hub located forward pedaling mode lower speed ratio driven sprocket via an idler sprocket mounted to and below the rider-right chain stay frame member to a second rear hub located backward pedaling mode higher speed ratio driven sprocket, and back. A forward driving overrunning clutch interfaces each counter-rotating driven sprocket to the rear hub. Comments: The idler sprocket location avoids chain path crossing interference, but requires the chain to re-align to each of the driven sprockets over a short distance, exacerbating chain to driven sprockets misalignment. Retro-Direct "do-it-yourself" enthusiasts tend to copy this design.

FR patent 338127 to Terrot & Company. The alternate forward driving speed ratio transmitting paths are implemented by a direct first forward pedaling mode lower speed ratio endless chain drive and a second backward pedaling mode higher speed ratio endless chain drive reversibly interfaced to the first chain drive via an intermediate sprocket cluster pair take-off. A forward driving overrunning clutch interfaces each counter-rotating driven sprocket to the rear hub. Comments: The physically parallel first and second chain drives facilitate chain to sprocket alignment. But the additional structure required to mount the sprocket cluster pair transfers additional forward and backward pedaling mode reaction loads to the bicycle frame.

FR patent 354891 to Terrot & Company. The alternate forward driving speed ratio transmitting paths are implemented by reversibly recirculating an endless chain from a first coplanar forward pedaling mode lower speed ratio drive and driven sprocket set to a second coplanar backward pedaling mode higher speed ratio drive and driven sprocket set, and back. The crank located drive sprockets are interfaced to the crank shaft via oppositely oriented overrunning clutches such that each pedaling mode action is exclusively transmitted to its mode effective segment of the chain. In addition, the rear hub located driven sprockets are also interfaced to the rear hub via overrunning clutches, but with each overrunning clutch similarly oriented to transmit a forward driving effort to the rear hub. Comments: This configuration employs more overrunning clutches than needed to achieve alternate transmitting path switching. Either the crank located or the hub located sprockets could be rigidly connected to their respective input or output members provided such coaxial and rigidly connected sprockets are of the same pitch diameter, thereby assuring the recirculated chain circulates both the crank and rear hub axes at the same link count rate. Also, at normal bicycle speed ratios, overrunning clutches located at the crank axis must transmit more torque than if located at the rear hub.

U.S. Pat. No. 0,954,672 to Didierjean. The alternate forward driving speed ratio transmitting paths are implemented by reversibly recirculating an endless chain from a first coplanar forward pedaling mode drive and driven sprocket set to a second coplanar backward pedaling mode drive and driven sprocket set, and back. The crank located drive sprockets are interfaced to the crank shaft via oppositely oriented overrunning clutches such that each pedaling mode action is exclusively transmitted to its mode effective segment of the chain. Both driven sprockets are of the same pitch diameter and rigidly connected to the rear hub as a unit. The relationship between an alternate forward driving speed ratio and a pedaling mode is specified as optional. Comments: At normal bicycle speed ratios, overrunning clutches located at the crank axis must transmit more torque than if located at the rear hub.

U.S. Pat. No. 5,254,042 to Chung-Suk, preferred embodiment. The alternate forward driving speed ratio transmitting paths are implemented by a conventional first forward pedaling mode endless chain drive and a second backward pedaling mode endless chain drive with its input/output rotation reversed via a symmetrical pair of idler sprockets mounted to the rear of the bicycle frame in the vicinity of the rear hub. A forward driving overrunning clutch interfaces each counter-rotating driven sprocket to the rear hub. Also optionally incorporated into the second backward pedaling mode chain drive is a manually operated multiple driven sprocket selecting chain derailleur system to add additional backward pedaling mode speed ratios. Comments: The separate parallel first and second chain drives facilitate chain to sprocket alignment. But the additional structure required to mount the backward pedaling mode idler sprocket pair transfers an additional backward pedaling mode reaction load to the bicycle frame.

U.S. Pat. No. 6,695,332 B1 to Kang, preferred embodiment. The alternate forward driving speed ratio transmitting paths are implemented by an indirect idler sprocket routed first backward pedaling mode endless chain drive and a second forward pedaling mode endless chain drive reversibly interfaced to the first chain drive via an intermediate sprocket cluster pair take-off. A forward driving overrunning clutch interfaces each counter-rotating driven sprocket to the rear hub. An additional manually operated clutch disconnects the rear hub from this transmission to permit the rider to roll the bicycle backward (simple Retro-Direct transmissions lock-up when back driven). Comments: The separate parallel first and second chain drives facilitate chain to sprocket alignment. But the additional structure required to mount the sprocket cluster pair and idler sprocket add additional forward and backward pedaling mode reaction loads to the bicycle frame. Also as presented, this transmission features equal forward and backward pedaling speed ratios, but its kinematics does not preclude unequal speed ratios.

Non-patent references Terrot & Co. Season 1904 Product Catalog, 2nd ed., 9 & 30 and Berto, Frank, The Dancing Chain, 4th ed., Cycle Publishing, 2012, 67-68 further explain and illustrate the Retro-Direct bicycle transmission concept and history.

Non-patent reference Wilson, David, Bicycling Science, 3rd ed., MIT Press, 2004, 86-88 gives the results of actual backward pedaling tests which show the efficacy of backward pedaling as nearly equal, or in some cases even superior, to forward pedaling.

Concurrently with and since the advent of the Retro-Direct bicycle transmission, other multi-speed transmission technologies have evolved to dominate the bicycle marketplace. Principally among these are multi-speed geared rear hubs and multiple sprocket selecting endless chain derailleur systems. Geared hubs now provide up to 14 progressive speed ratios. Derailleur systems can now reposition an endless chain between as many as 11 hub located driven sprockets and 3 crank located drive sprockets in any combination (but certain combinations in the extreme are not practical for "cross-chaining" reasons).

Also evolved among a certain set of cyclists (especially those who are urban dwelling commuters or bicycling purists) is a desire to return to bicycles of less complexity and/or minimalist aesthetics, with the side benefit of less required maintenance, i.e., bicycles equipped with a simple single speed endless chain transmission. However, single speed bicycles are hard to accelerate from a dead stop (intersection safety issue) and bog down on moderate hills (utility issue). But, what if an automatic second speed could be added with little additional complexity or loss of efficiency to help with starting out and/or moderate inclines?

BRIEF SUMMARY OF THE INVENTION

This leads to the present invention which discloses an improved Retro-Direct bicycle transmission that can be unobtrusively and compactly adapted to a conventionally configured modern bicycle frame without structural appendage or modification (other than the addition of a small locating pin hole in the rider-right end face of the crank bearing support member of the bicycle frame). This transmission is of the idler sprocket recirculated endless chain type similar in concept to the Mimard patent, but with the idler sprocket increased in diameter and relocated from near the rear hub forward to a location between the crank bearing support member of the bicycle frame and the drive sprocket, with its axis of rotation optimally skewed with respect to the crank axis, and in combination with a different preferred chain path routing. Several functional and structural advantages accrue from this revised idler sprocket location, its skewed orientation and the accordingly preferred chain path routing, as explained in the Detailed Description of the Invention below.

DETAILED DESCRIPTION OF THE INVENTION

Figure 1A:
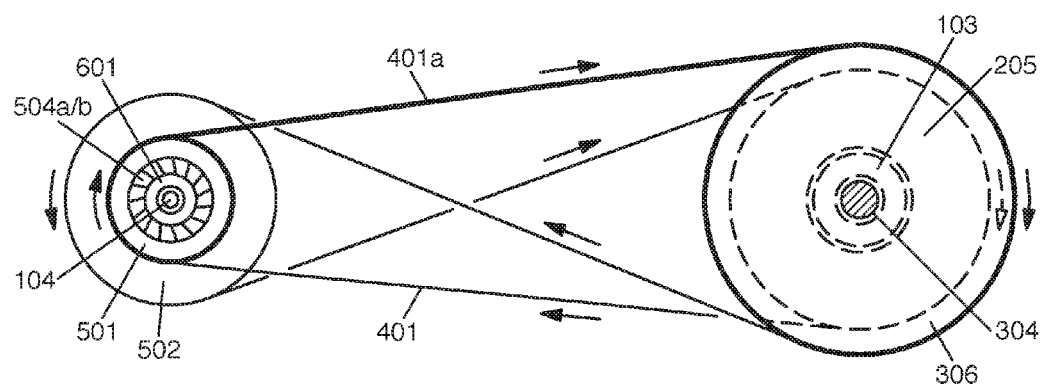
FIGS. 1A and 1B are simplified kinematic illustrations of the present invention which explain the forward pedaling and backward pedaling modes of operation respectively.

The present invention is assumed installed on a conventional "diamond" type bicycle frame. First referring to FIGS. 1A and 1B to explain the basic kinematics, the view is to the rider-right side. Input is from a pedal and crank driven crank shaft 304 and output is to a rear hub connected member 601. Component 103 is a composite representation of features integral with or adapted to the bicycle frame. Its inside diameter represents an external bearing for the crank shaft 304, and its outside diameter represents an internal bearing for a free turning idler sprocket 205. A rear hub axle 104, kinematically part of the bicycle frame, completes the kinematic reference structure. A single drive sprocket 306 is rigidly connected to the crank shaft 304. A forward pedaling mode lower speed ratio driven sprocket 501 is interfaced to the rear hub connected member 601 via a first forward driving overrunning clutch 504a, and a backward pedaling mode higher speed ratio driven sprocket 502 (located to the rider-left side of driven sprocket 501) is interfaced to the rear hub connected member 601 via a second forward driving overrunning clutch 504b (co-axial with and hidden behind overrunning clutch 504a). An endless chain 401 is recirculated around all four sprockets as shown, with the breaks in the chain path representing locations where the chain 401 crosses behind itself. The arrows represent the motion of the chain and engaged sprockets.

FIG. 1A explains the forward pedaling mode of operation via a first forward driving transmission path. All concurrently, the rider powered drive sprocket 306 is driven clockwise, chain segment 401a is tensioned, driven sprocket 501 is actively driven clockwise causing its associated overrunning clutch 504a to engage the rear hub connected member 601 and drive it clockwise, chain 401 is recirculated clockwise around idler sprocket 205, driven sprocket 502 is passively driven counter-clockwise causing its associated overrunning clutch 504b to disengage (i.e., overrun) the rear hub connected member 601, and a lower speed ratio forward driving effort is delivered to the rear hub.

Figure 1B:
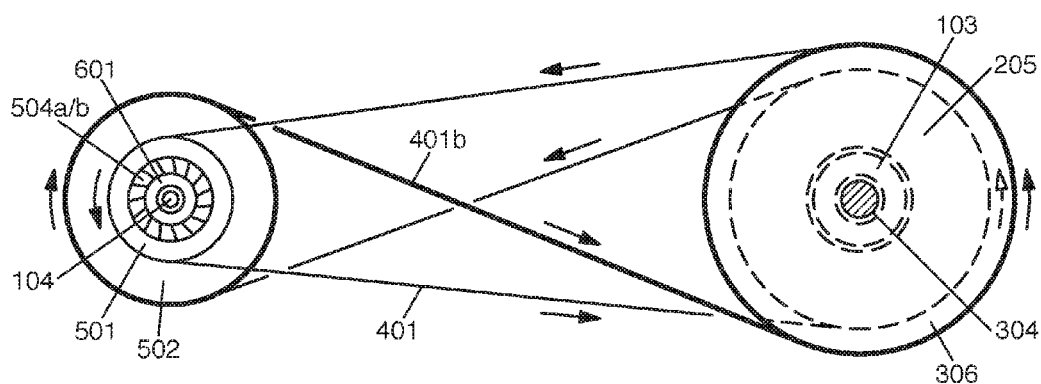

Alternately, FIG. 1B explains the backward pedaling mode of operation via a second forward driving transmission path. All concurrently, the rider powered drive sprocket 306 is driven counter-clockwise, chain segment 401b is tensioned, driven sprocket 502 is actively driven clockwise causing its associated overrunning clutch 504b to engage the rear hub connected member 601 and drive it clockwise, chain 401 is recirculated counter-clockwise around idler sprocket 205, driven sprocket 501 is passively driven counter-clockwise causing its associated overrunning clutch 504a to disengage (i.e., overrun) the rear hub connected member 601, and a higher speed ratio forward driving effort is delivered to the rear hub.

Additionally, if the speed of the bicycle overtakes the rate of pedaling, either backward or forward, both overrunning clutches 504a and 504b disengage (i.e., overrun) to facilitate a coasting mode.

But, if a rider attempts to roll a bicycle equipped with the present invention backward (i.e., back drive the transmission), both overrunning clutches 504a and 504b engage simultaneously and the transmission locks-up. How this happens is difficult to visualize, but consider the following back driving scenario:

First the rear hub connected member 601 is turned counter-clockwise as a back driving input to the transmission. Then assume in response that overrunning clutch 504a engages "first." This causes its associated driven sprocket 501 to turn counter-clockwise. Then in response the recirculated chain 401 tries to drive the driven sprocket 502 clockwise. But, this action also causes its associated overrunning clutch 504b to engage and try to drive the rear hub connected member 601 clockwise, counter to its back driving input. Therefore lock-up, and regardless of the "sequence" of the scenario.

So if the rider wants to roll a Retro-Direct transmission equipped bicycle backward, the rider can't without lifting the rear wheel (easily done by lifting by the back of the seat). However, this behavior can also act as a "hill holder," perhaps an asset on a heavily laden utility bicycle.

Figure 2A:
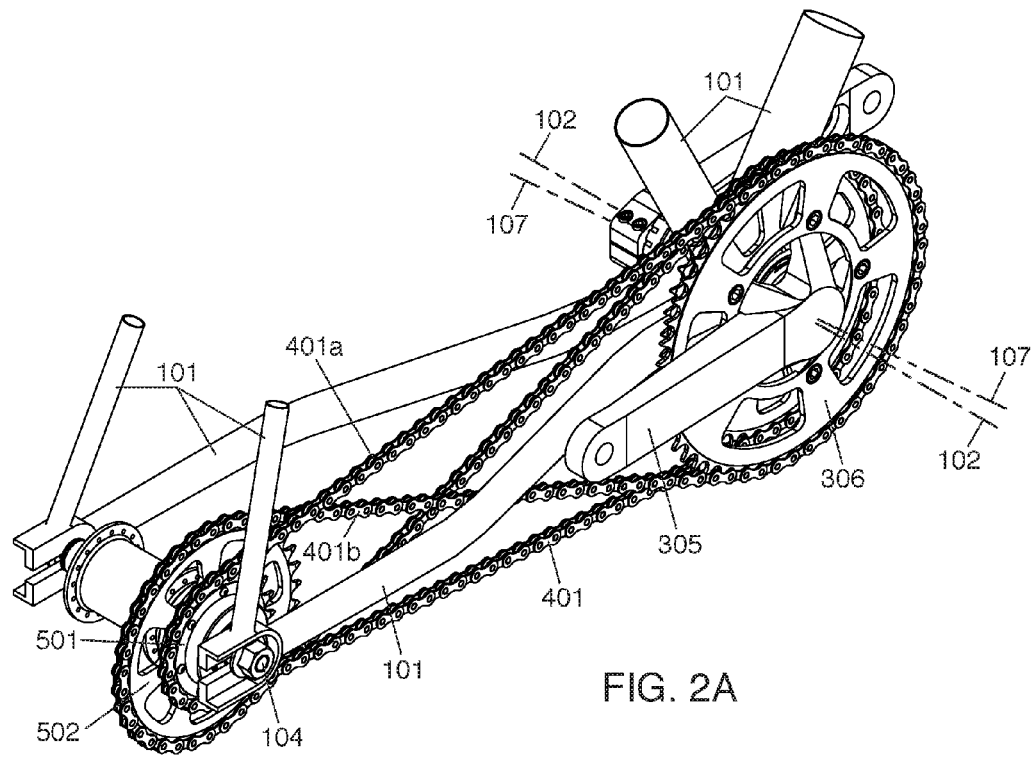
FIGS. 2A and 2B are rider-right side and rider-left side perspective illustrations respectively of the present invention as installed on a conventional "diamond" type bicycle frame shown cut short.
Figure 2B:
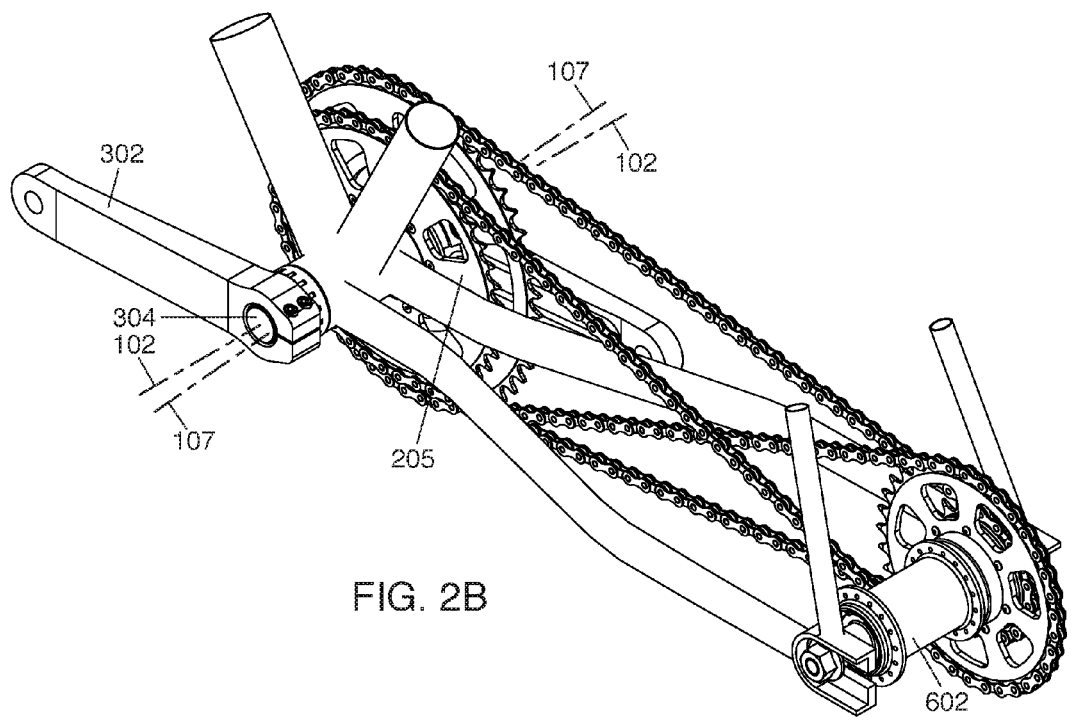

FIGS. 2A and 2B are perspective illustrations that reveal certain spatial details that particularly differentiate the present invention from the related art. Foremost among these is the relatively large diameter idler sprocket 205 with an axis of rotation 107 proximate but skewed with respect to the axis of rotation 102 of the crank shaft 304 and located between the drive sprocket 306 and adjacent members of the bicycle frame 101. In combination with the relatively large (but not untypical) diameter drive sprocket 306 and carefully adjusted spatial relationships between all four sprockets and the recirculated chain 401 path, the idler sprocket 205 location and its skewed orientation helps to:

1. Direct and receive the recirculated chain 401 to and from the two rear hub located driven sprockets 501 and 502 with a minimum of chain path misalignment,
2. Facilitate a minimum backward pedaling mode higher speed ratio driven sprocket 502 to drive sprocket 306 chain path mis-alignment,
3. Preclude chain path self-interference,
4. Preclude chain path to frame 101 interference,
5. Overall facilitate a more compact lateral transmission envelope as opposed to that needed if the idler sprocket 205 were not skewed, which also helps to
6. Maintain an ergonomically minimum pedal to pedal footprint.

Additionally, in comparison with the Related Art referenced Mimard patent idler sprocket location and mounting, the location of the idler sprocket 205 is better protected from road hazards, and more secure with its mounting directly to a major structural node of a conventional "diamond" type bicycle frame (i.e., the crank bearing support member) rather than via a bracket appended to and extending beneath the rider-right chain stay member of a conventional "diamond" type bicycle frame.

Figure 3:
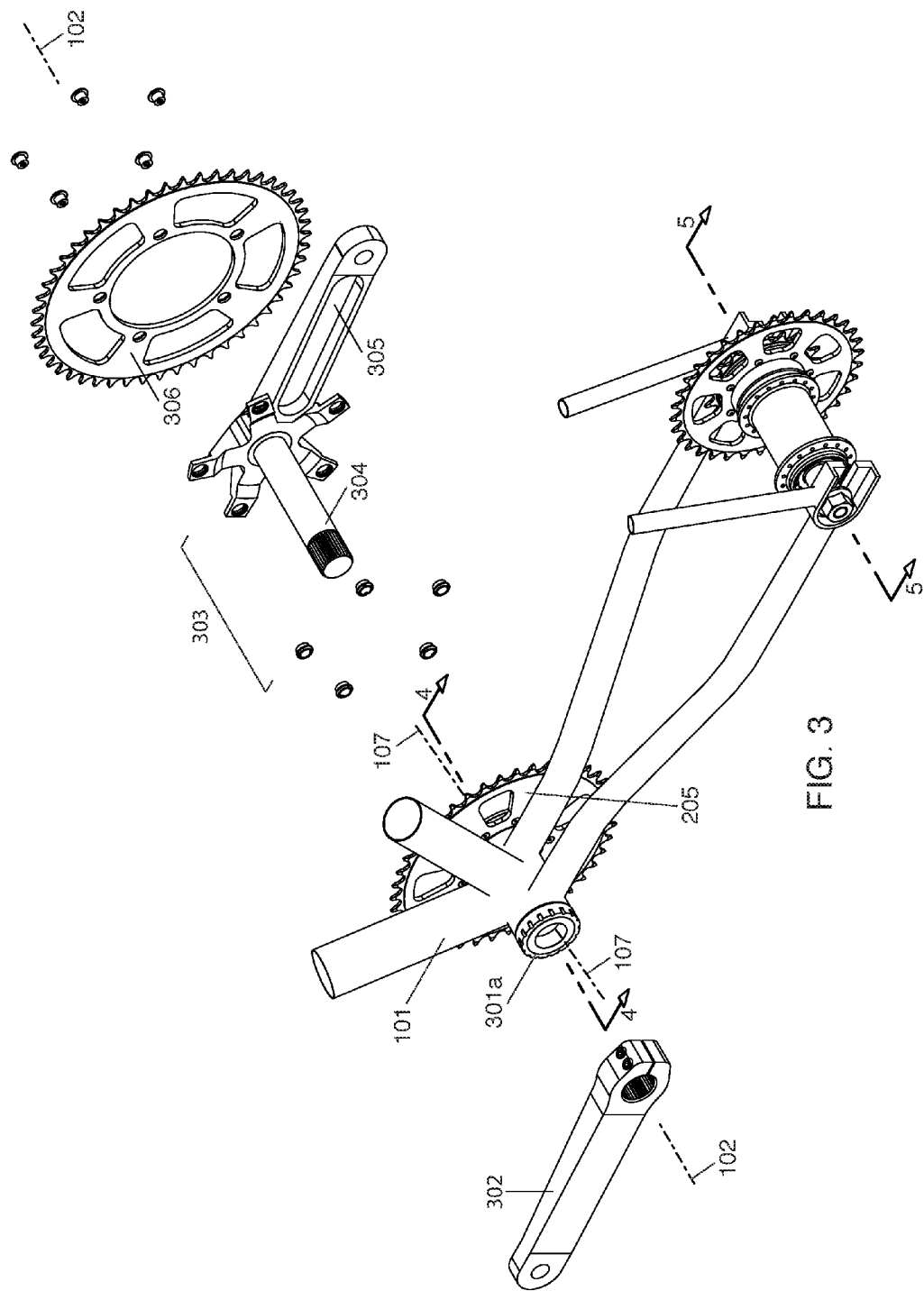
FIG. 3 is a version of FIG. 2B with the chain removed and certain crank axis centered parts exploded out as a setup for FIG. 4.
Figure 4:
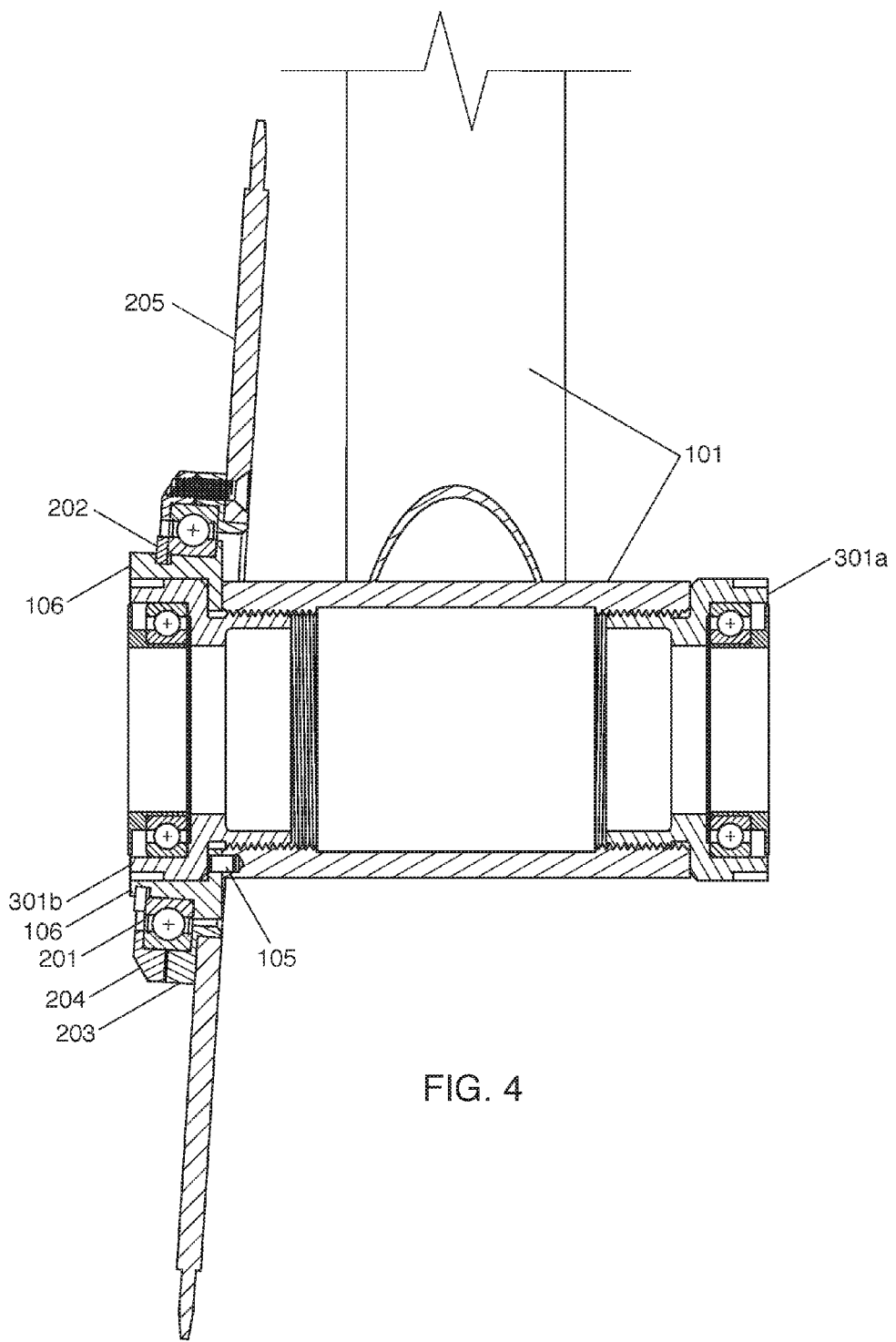
FIG. 4 is a cross-section of the idler sprocket and its mounting to the crank bearing support member of the bicycle frame as indicated in FIG. 3.

FIG. 3 is a version of FIG. 2B with the chain 401 removed and certain crank axis 102 centered parts exploded out as a setup for FIG. 4. Here the exploded out part of FIG. 3 reveals the construction of a modern two-piece bicycle crank set, where a rider-right "half" 303 incorporates the crank shaft 304 and a rider-right crank arm 305 as a unit, and a rider left "half" crank arm 302 is more conventionally attached to complete the full crank set subassembly. Such crank set kits normally also incorporate a pair of crank bearing units 301a and 301b (hidden behind frame 101 here) which thread into each side of the crank bearing support member of frame 101 and, in the case of the present invention, provide a convenient means to secure an idler sprocket bearing support as follows.

FIG. 4 is a cross-section (per the 4-4 cutting plane indicated in FIG. 3) that shows a particular adaptation of the idler sprocket 205 to the crank bearing support member of frame 101, but with the idler sprocket 205 rendered as merely tilted with its axis of rotation located in the plane of the view rather than as actually skewed for clarity. Here it can be seen that an idler sprocket bearing support 106 is conveniently clamped to the rider-right side of the crank bearing support member of frame 101 by the rider-right crank bearing unit 301b and rotationally located with respect to the crank bearing support member of frame 101 by a pin 105. This spaces out the rider-right crank bearing unit 301b by the thickness of the idler sprocket bearing support 106 internal flange, which is within the range of adjustment by shims afforded by the two-piece crank set. Alternately (if necessary, or desired for sprocket alignment purposes), the rider-right face of the crank bearing support member of frame 101 can be faced back with standard bicycle shop tools. Mounting the idler sprocket 205 to the idler sprocket bearing support 106 is completed by assembling the outer race of an idler sprocket bearing 201 to the idler sprocket 205 via an adapter ring 203 and a clamp ring 204, and then fitting this subassembly to the idler sprocket bearing support 106 and securing with a retaining ring 202.

Figure 5:
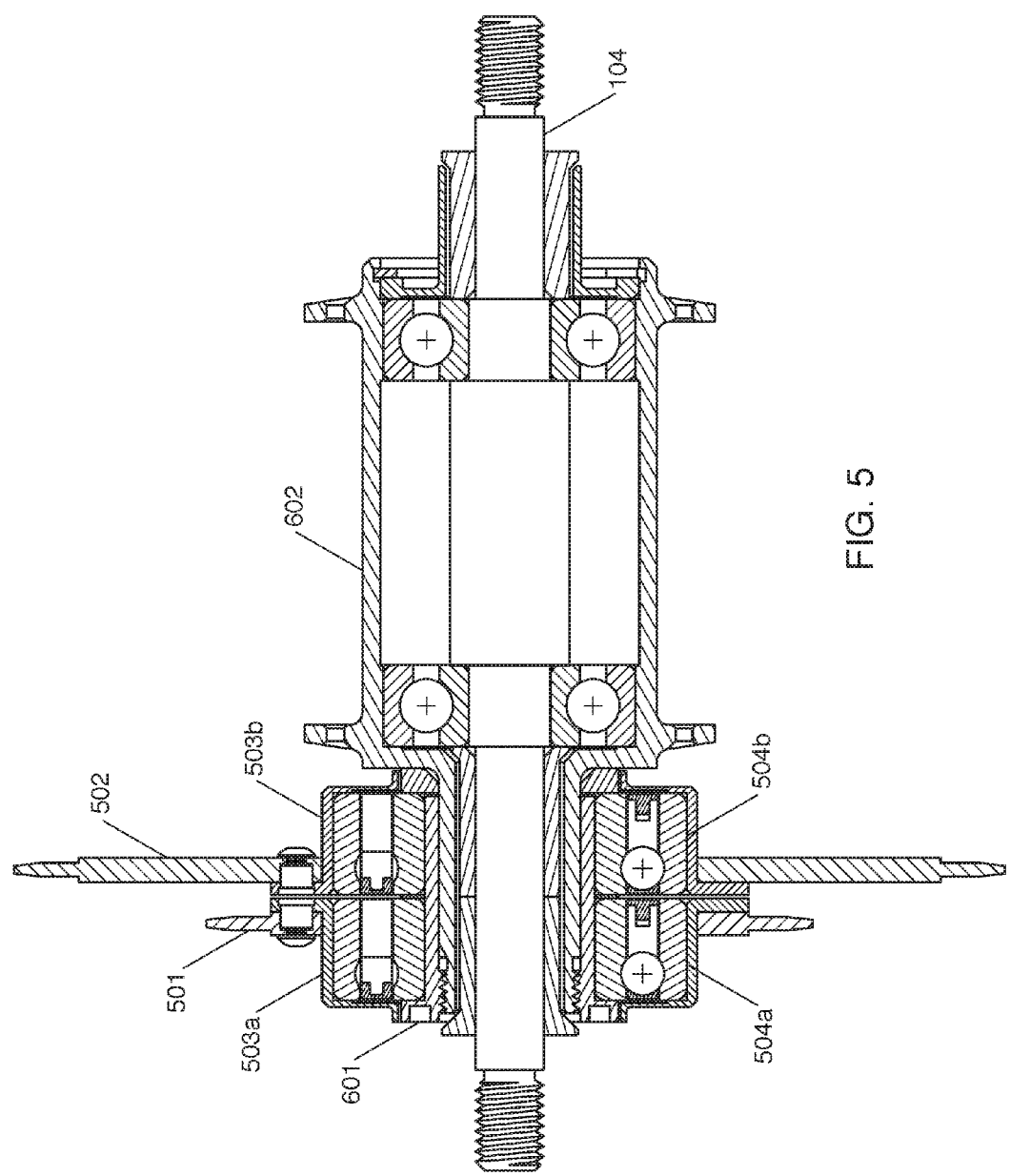
FIG. 5 is a cross-section of the rear hub subassembly as indicated in FIG. 3.

FIG. 5 is a cross-section (per the cutting plane 5-5 indicated in FIG. 3) that shows a particular adaptation of the present invention to the rear hub 602. Here the outer race of overrunning clutch 504*a* is connected to the forward pedaling mode lower speed ratio driven sprocket 501 via an interference fit joined external adapter 503*a*. Similarly, the outer race of overrunning clutch 504*b* is is connected to the backward pedaling mode higher speed ratio driven sprocket 502 via an interference fit joined external adapter 503*b*. The inner race of both overrunning clutches 504*a* and 504*b* are in common interference fit joined to the rear hub connected member 601, threaded onto the rear hub 602 at its rider-right end extension.

The overrunning clutches 504*a* and 504*b* illustrated as an example are of the sprag traction type and incorporate ball bearings for radial stability. "Pulling" the top edge of either driven sprocket toward the viewer (clockwise turning of the sprockets as viewed from the rider-right) causes its associated overrunning clutch to engage the rear hub connected member 601 to transmit a forward driving effort to the rear hub 602. "Pushing" the top edge of either driven sprocket away from the viewer (counter-clockwise turning of the sprockets as viewed from the rider-right) causes its associated overrunning clutch to disengage the rear hub connected member 601 and passively overrun. Recalling that input to each overrunning clutch via their associated driven sprockets is counter-rotational, and with the directions of rotation dependent on the direction of rider pedaling input, alternate transmission path alternate forward driving speed ratio Retro-Direct transmission functionality is achieved.

Note: The standard definition of a geared system speed ratio, which is also equivalent to its torque multiplying ratio, is the driving shaft speed divided by the driven shaft speed. And in a simple paired sprocket endless chain transmission, this is equivalent to the driven sprocket pitch diameter divided by the driving sprocket pitch diameter. So for the present invention as described herein, both alternate speed or torque multiplying ratios are less than unity, but with the backward pedaling mode speed or torque multiplying ratio greater than the forward pedaling mode speed or torque multiplying ratio.

While a particular embodiment of the present invention has been described, the invention may be modified and adapted to various bicycle transmission applications by those skilled in the art. Therefore, this invention is not limited to the description and figures shown herein, and includes all such embodiments and modifications that are encompassed by the scope of the Claim.

What is claimed is:

1. A two-speed bicycle transmission whereby pedaling backward inherently provides a higher forward driving speed ratio between a bicycle crank with an axis of rotation as input and a bicycle rear hub with an axis of rotation as output comprising:

A) a bicycle frame which provides a fixed parallel relationship between the axis of rotation of said bicycle crank and the axis of rotation of said bicycle rear hub;

B) a drive sprocket coaxial with the axis of rotation of said bicycle crank and rigidly connected to said bicycle crank;

C) a lower speed ratio driven sprocket coaxial with the axis of rotation of said bicycle rear hub and in substantial coplanar alignment with said drive sprocket, wherein said lower speed ratio driven sprocket is separately interfaced to said bicycle rear hub by a first overrunning clutch such that only a forward driving effort is transmitted to said bicycle rear hub;

D) a higher speed ratio driven sprocket coaxial with the axis of rotation of said bicycle rear hub and located between said lower speed ratio driven sprocket and said bicycle rear hub, wherein said higher speed ratio driven sprocket is separately interfaced to said bicycle rear hub by a second overrunning clutch such that only a forward driving effort is transmitted to said bicycle rear hub;

E) an idler sprocket with an axis of rotation proximate but skewed with respect to the axis of rotation of said bicycle crank and located between said drive sprocket and adjacent members of said bicycle frame, wherein
  1) said idler sprocket is mounted on an idler bearing,
  2) said idler bearing is mounted on an idler bearing support, and
  3) said idler bearing support is rigidly connected or otherwise joined to said bicycle frame;

F) an endless chain that connects the following:
  1) a tangential top of said drive sprocket to a tangential top of said lower speed ratio driven sprocket,
  2) a tangential bottom of said drive sprocket to a tangential top of said higher speed ratio driven sprocket,
  3) a tangential bottom of said idler sprocket to a tangential bottom of said lower speed ratio driven sprocket, and
  4) a tangential top of said idler sprocket to a tangential bottom of said higher speed ratio driven sprocket; and G) wherein the location, pitch diameter and skewed axis of rotation of said idler sprocket all combine to
  1) steer said endless chain so its path segment connecting the tangential bottom of said drive sprocket to the tangential top of said higher speed ratio driven sprocket approaches but does not interfere with its path segment connecting the tangential top of said idler sprocket to the tangential bottom of said higher speed ratio driven sprocket, and
  2) direct and receive said endless chain to and from said lower speed ratio driven sprocket and said higher speed ratio driven sprocket with a minimum of chain path misalignment.

\* \* \* \* \*